US012270734B2

(12) United States Patent
Shaw et al.

(10) Patent No.: US 12,270,734 B2
(45) Date of Patent: Apr. 8, 2025

(54) FASTENER TESTING SYSTEM AND APPARATUS

(71) Applicant: Henkel AG & Co. KGaA, Duesseldorf (DE)

(72) Inventors: Daniel Shaw, Middletown, CT (US); Thomas Buckley, Lebanon, CT (US); Philippe Huber, North Branford, CT (US); Ornella Tempo, Wethersfield, CT (US); Robert Dunkel, Mississauga (CA); Jess P. Carlson, Chagrin Falls, OH (US); Donald C. Fuchs, Mentor, OH (US); Nicholas E. Stanca, Westlake, OH (US); Paul D. Stephens, Twinsburg, OH (US); James E. Szpak, Cleveland Heights, OH (US)

(73) Assignee: Henkel AG & Co. KGaA, Duesseldorf (DE)

( * ) Notice: Subject to any disclaimer, the term of this patent is extended or adjusted under 35 U.S.C. 154(b) by 244 days.

(21) Appl. No.: 17/712,504

(22) Filed: Apr. 4, 2022

(65) Prior Publication Data

US 2022/0283053 A1 Sep. 8, 2022

Related U.S. Application Data

(63) Continuation of application No. PCT/US2020/054206, filed on Oct. 5, 2020.

(60) Provisional application No. 62/910,107, filed on Oct. 3, 2019.

(51) Int. Cl.
*G01M 7/02* (2006.01)

(52) U.S. Cl.
CPC ............ *G01M 7/027* (2013.01); *G01M 7/022* (2013.01); *G01M 7/025* (2013.01)

(58) Field of Classification Search
CPC ....... G01M 7/027; G01M 7/022; G01M 7/025
USPC .......................................................... 73/663
See application file for complete search history.

(56) References Cited

U.S. PATENT DOCUMENTS

| 4,603,587 A | * | 8/1986 | Kimball | ................. | G01M 7/04 |
| | | | | | 73/663 |
| 4,719,694 A | | 1/1988 | Herberich et al. | | |
| 4,912,980 A | * | 4/1990 | Baughn | ................... | G01N 3/00 |
| | | | | | 73/663 |
| 5,014,000 A | * | 5/1991 | Schlagheck | ............. | G01R 1/04 |
| | | | | | 73/860 |

(Continued)

FOREIGN PATENT DOCUMENTS

| CN | 209280300 U | 8/2019 | |
| JP | 3053748 B2 * | 6/2000 | ............ H01H 11/00 |

(Continued)

OTHER PUBLICATIONS

Translation of JP 3053748 B2 (Year: 2000).*

(Continued)

*Primary Examiner* — John E Breene
*Assistant Examiner* — Rose M Miller
(74) *Attorney, Agent, or Firm* — Steven C. Bauman

(57) ABSTRACT

A fastener testing system includes a vibration testing apparatus including a test station and a preparation station. The preparation station is configured to have a plurality of test pieces sequentially assembled therein. The test station is configured to sequentially receive and vibrate each assembled test pieces of the plurality of test pieces.

19 Claims, 17 Drawing Sheets

(56) References Cited

U.S. PATENT DOCUMENTS

| | | | |
|---|---|---|---|
| 8,839,675 B2* | 9/2014 | Miller | G01M 7/02 |
| | | | 244/114 R |
| 2003/0007844 A1 | 1/2003 | Terry | |
| 2012/0279305 A1 | 11/2012 | Nielsen | |

FOREIGN PATENT DOCUMENTS

| | | |
|---|---|---|
| JP | 3144692 U | 9/2008 |
| JP | 2019119033 A | 7/2019 |
| WO | 0026547 | 5/2000 |

OTHER PUBLICATIONS

Pai N G et al., "Three-dimensional finite element analysis of threaded fastener loosening due to dynamic shear load", Engineering Failure Analysis, Pergamon, GB, vol. 9, No. 4, pp. 383-402 (2017).

PCT International Search Report—International Application No. PCT/US2020/054206—Mailing date: Jan. 20, 2021.

* cited by examiner

FASTENER TESTING SYSTEM AND APPARATUS

TECHNICAL FIELD

The present disclosure relates to testing of fasteners.

BACKGROUND

A Junker test is a mechanical test used to determine the point at which a joint secured by a threaded fastener loses its preload, due to a self-loosening of the threaded fastener, when subjected to shear loading caused by transverse vibration. Criteria for Junker vibration testing may be found in SAE paper 690055, entitled "New Criteria for Self-Loosening of Fasteners Under Vibration." Known machines for performing Junker tests are not practical for demonstration purposes because the machines are large and, therefore, not easily transported. Additionally, testing multiple fasteners in a short period of time using known Junker test machines, for example, for demonstration purposes, is problematic because the known machines only accommodate one fastener at a time and the one fastener needs to be properly installed in the machine with the appropriate preload prior to being tested. This makes it difficult to compare different fasteners and/or different threadlockers applied to fasteners to demonstrate the different capabilities thereof.

SUMMARY

The present disclosure provides and improved system for performing vibration testing of joints secured by threaded fasteners and for testing and comparing adhesive threadlockers applied to such threaded fasteners.

According to the present disclosure, a vibration testing apparatus may comprise a test station including a first member and a second member defining an opening configured to receive a test piece therein. The second member may be configured to slide in reciprocating transverse motion relative to the first member, and a motorized drive assembly may be configured to drive the second member in the reciprocating transverse motion relative to the first member.

According to the present disclosure, the vibration testing apparatus may further comprise a preparation station that is separate from the test station. The preparation station may include an opening configured to receive the test piece therein and to position a first joint member of the test piece relative to a second joint member of the test piece with proper alignment.

According to the present disclosure, the reciprocating transverse motion of the second member of the test station relative to the first member may vibrate the second joint member of the test piece relative to the first joint member of the test piece while the test piece is disposed in the test station.

According to the present disclosure, the vibration testing apparatus may further comprise a motor control input and a controller operatively connected to the motor control input and the motorized drive assembly. The controller may provide power to activate the motorized drive assembly in response to a signal from the motor control input.

According to the present disclosure, the controller may be operatively connectable to a sensor of the test piece.

According to the present disclosure, the vibration testing apparatus may further comprise a display and the controller may be configured to provide an indication on the display when a fastener of the test piece fails. The indication may be based on a force detected by the sensor, the force being indicative of clamp load. The display may be built into a housing of the vibration testing apparatus, such as a plurality of light emitting diodes or the display may be a screen or the like on a remote device such as a computer, tablet, mobile phone, or the like that is in communication with the vibration testing apparatus via a wired or wireless connection, such as via Bluetooth.

According to the present disclosure; the controller may further comprise a transmitter module configured to communicate with a remote device. The controller may provide a signal indicative of a clamp load to the remote device, the clamp load being inferred from force detected by the sensor.

According to the present disclosure, a vibration testing apparatus may comprise a preparation station configured to have a plurality of test pieces sequentially assembled therein and a test station configured to sequentially receive and vibrate each assembled test piece of the plurality of test pieces. The vibration testing apparatus may further comprise a motorized drive assembly configured to vibrate at least a portion of the test station.

According to the present disclosure, the vibration testing apparatus may further comprise a controller operatively connected to the motorized drive assembly. The controller may power the motorized drive assembly to vibrate the at least a portion of the test station. The motorized drive assembly may vibrate the at least a portion by driving a first member of the test station in reciprocating transverse motion relative to a second member of the test station.

According to the present disclosure, the vibration testing apparatus may further comprise a securing system configured to secure a portion of each assembled test piece to the second member of the test station while the test piece is vibrated therein.

According to the present disclosure, the vibration testing apparatus may comprise a manual input for manually driving the motorized drive assembly, for example, to align the first member and second member of the test station for receipt and release of an assembled test piece of the plurality of test pieces in the test station.

According to the present disclosure, the preparation station may be separate from and adjacent to the test station.

According to the present disclosure, the vibration testing apparatus may comprise an ejection system configured to eject test pieces of the plurality of test pieces from at least one of the preparation station or test station.

According to the present disclosure, a fastener testing system may comprise a plurality of test pieces and a vibration testing apparatus. The vibration testing apparatus may include a test station and a preparation station adjacent to one another. The test station may be configured to receive and vibrate a test piece of the plurality of test pieces. The test pieces of the plurality of test pieces may be assembled in the preparation station.

According to the present disclosure, each test piece of the plurality of test pieces may include a first joint member and a second joint member. Each test piece may further comprise a fastener coupling the first joint member to the second joint member.

According to the present disclosure, the test station may include a first member and a second member defining an opening configured to receive a test piece therein. The second member may be configured to slide in reciprocating transverse motion relative to the first member. The vibration testing apparatus may further comprise a motorized drive assembly configured to drive the second member in the reciprocating transverse motion relative to the first member.

According to the present disclosure, the preparation station may include an opening configured to receive one test piece of the plurality of test pieces therein and to position the first joint member of the test piece relative to the second joint member of the test piece.

BRIEF DESCRIPTION OF THE DRAWINGS

These and other features and advantages of the present invention will be better understood by reading the following detailed description, taken together with the drawings wherein.

DETAILED DESCRIPTION

Figure 1:
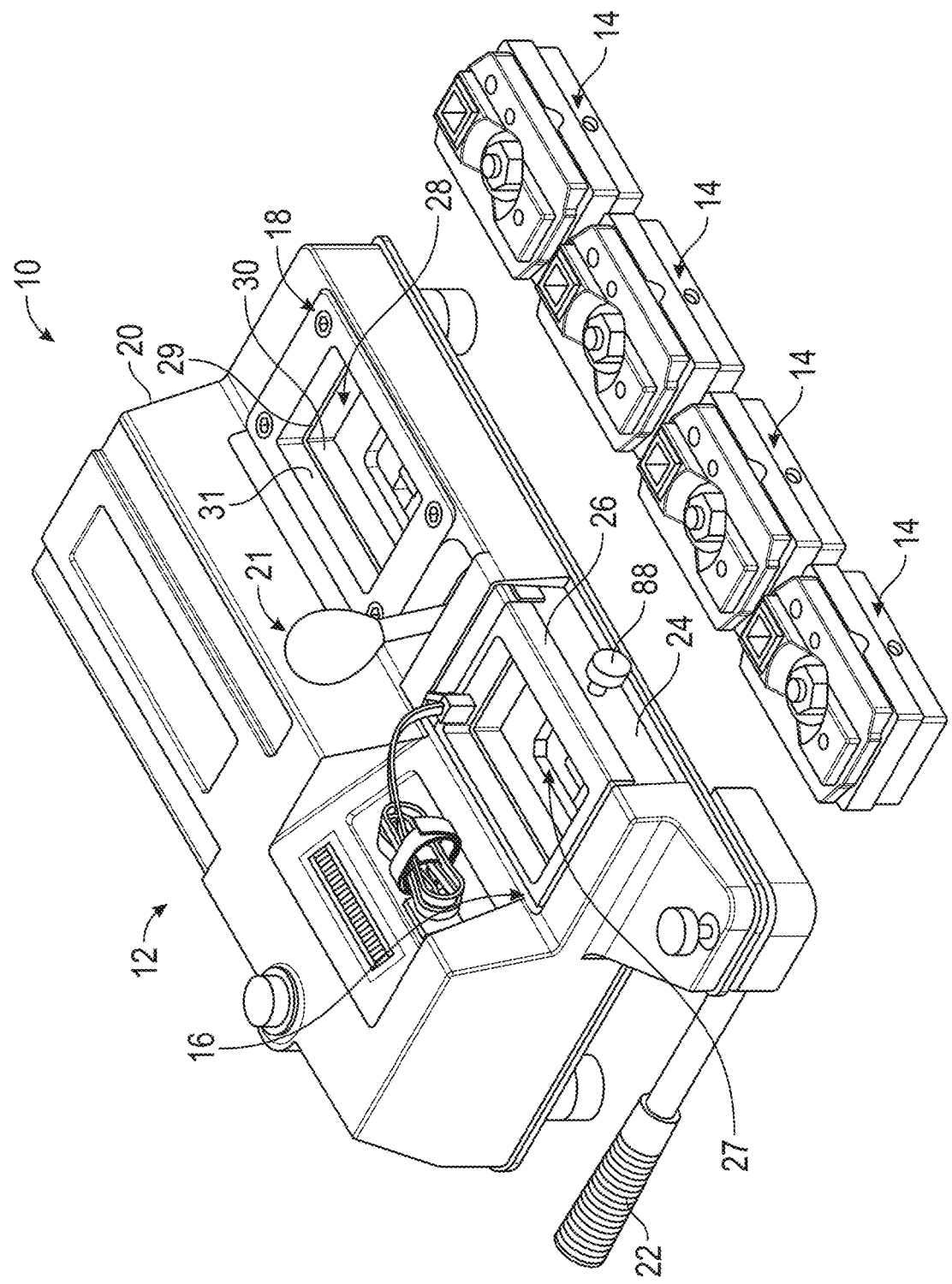
FIG. 1 is a perspective view of a fastener testing system in accordance with the present disclosure.

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

In the drawings, although certain descriptions may refer only to certain figures and reference numerals, it should be understood that such descriptions might be equally applicable to like reference numerals in other figures. Additionally, although various features have been shown in different figures for simplicity, it should be readily apparent to one of skill in the art that the various features may be combined without departing from the scope of the present disclosure.

FIG. 1 shows a fastener testing system 10 in accordance with the present disclosure. Fastener testing system 10 includes a vibration testing apparatus 12 and one or more test pieces 14. The vibration testing apparatus 12 includes a test station 16 and a preparation station 18 arranged in a body 20. The vibration testing apparatus 12 may also include an ejection system 21 for assisting with removal of test pieces 14 from the test station 16 and/or the preparation station 18 and a stabilization handle 22 at an end of the body 20.

The test station 16 includes a fixed base member 24 and an upper member 26 defining a test cavity 27 configured to receive a test piece 14 therein. The upper member 26 is arranged on the base member 24 and is configured to slide in reciprocating transverse motion relative to the base member 24.

The preparation station 18 is separate from the test station 16 and includes a cavity 28 configured to receive the test piece 14 therein to prepare the test piece 14 for subsequent testing in the test station 16. An inner wall 29 of the preparation station 18 defining the cavity 28 may have a stepped configuration such that a lower portion 30 of the cavity 28 is smaller than an upper portion 31 of the cavity 28.

Figure 2:
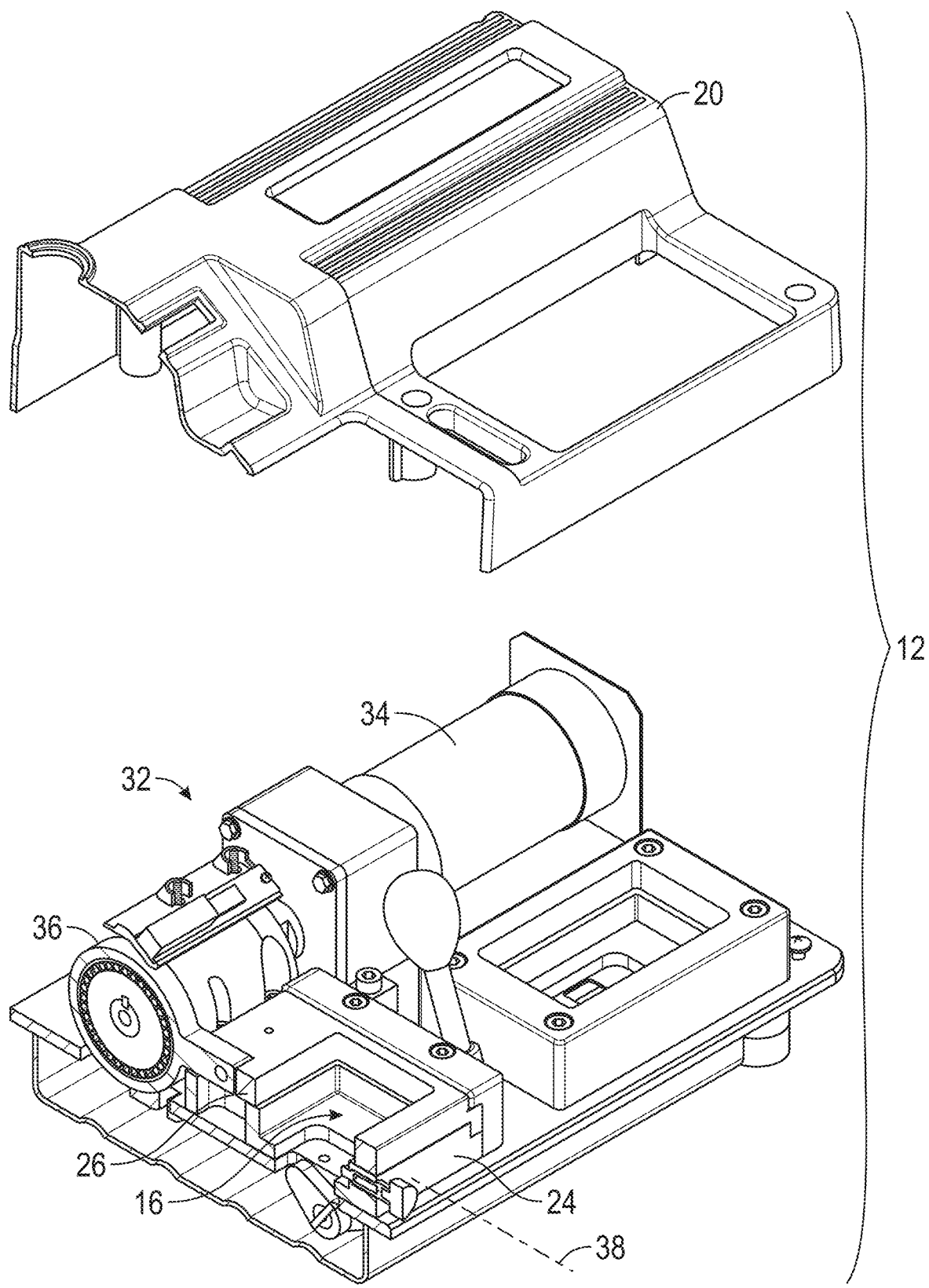
FIG. 2 is a partially exploded side cross-sectional perspective view of a vibration testing apparatus of the fastener testing system shown in FIG. 1.
Figure 3:
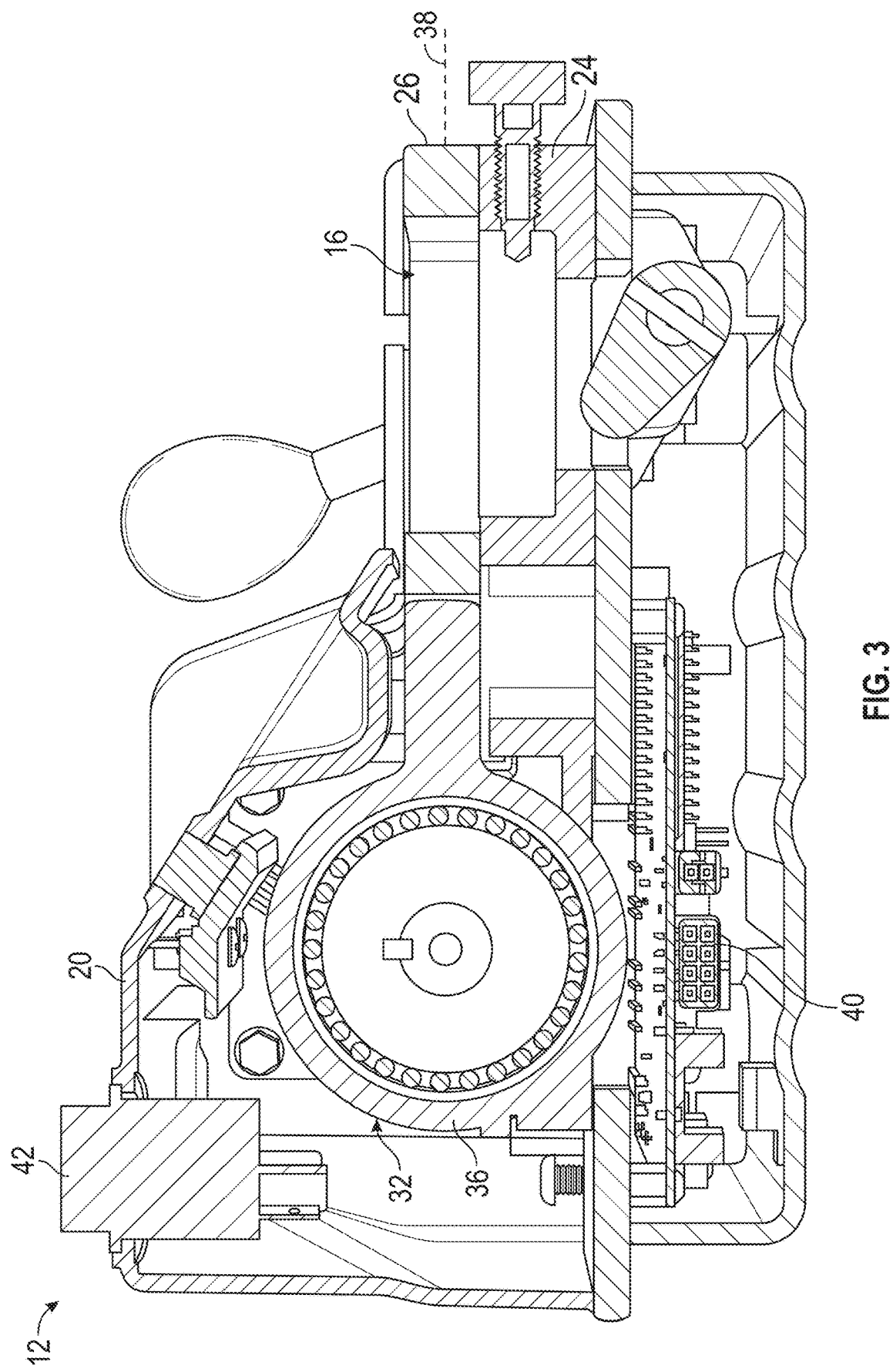
FIG. 3 is a side cross-sectional perspective view of the vibration testing apparatus shown in FIG. 2.

Referring to FIGS. 2 and 3, the vibration testing apparatus 12 also includes a motorized drive assembly 32 located within the body 20. The motorized drive assembly 32 includes a motor 34, shown in FIG. 2, or other similar driving mechanism, and a geared transmission 36 connecting the motor 34 to the upper member 26 of the test station 16. The geared transmission 36 is configured to convert rotary motion of the motor 34, shown in FIG. 2, into reciprocal motion to drive the upper member 26 in reciprocating transverse motion relative to the base member 24 along axis 38. As seen in FIG. 3, the vibration testing apparatus 12 includes a controller 40 for controlling powered actuation of the motorized drive assembly 32, and a motor control input 42 operatively coupled to the controller 40.

Figure 4:
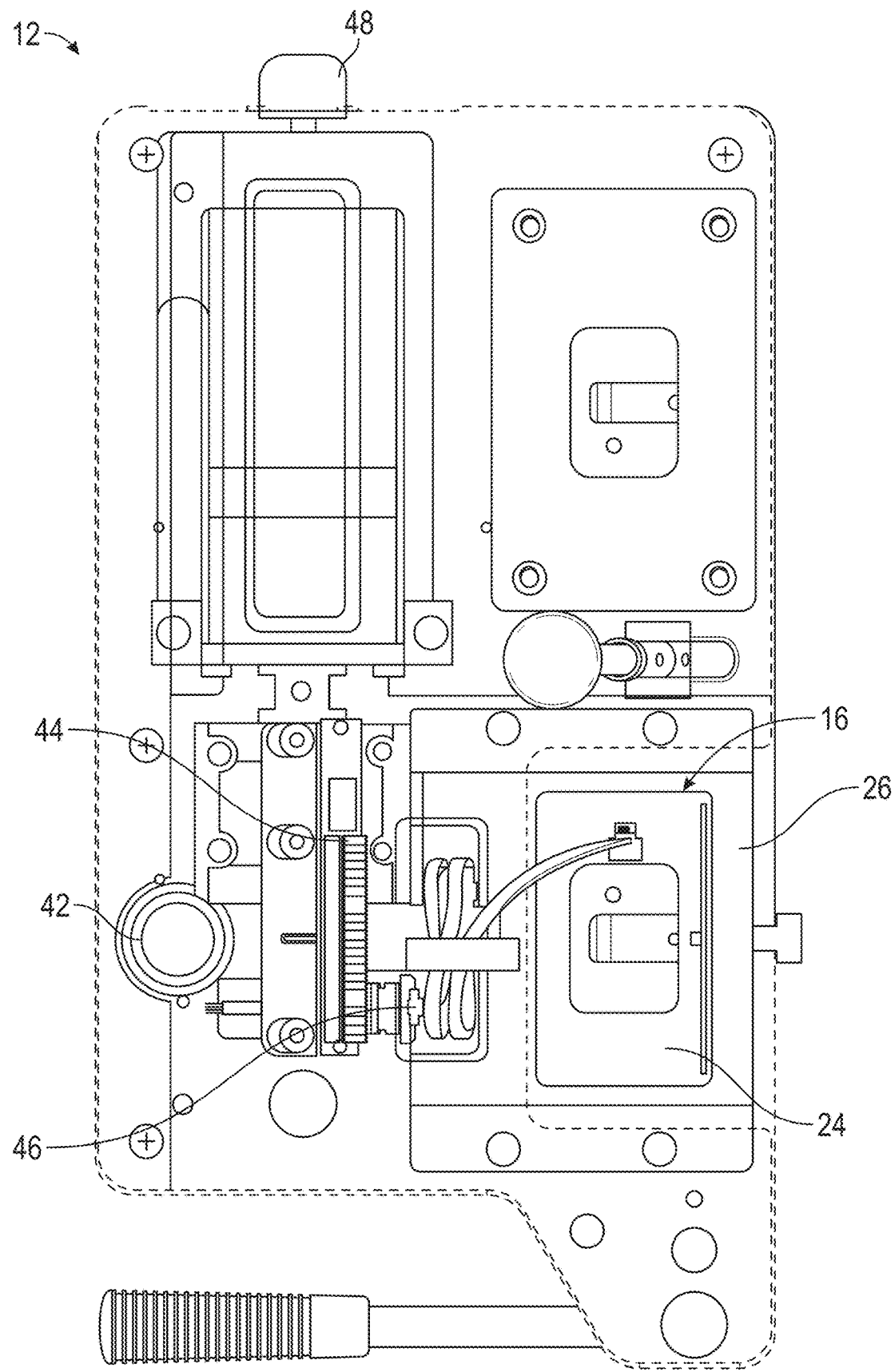
FIG. 4 is a top view of the vibration testing apparatus shown in FIG. 2.

Referring to FIG. 4, the vibration testing apparatus 12 may also include a display 44 and a sensor port 46 that are operatively coupled to the controller 40, shown in FIG. 3. The vibration testing apparatus 12 may also include a manual input 48 allowing a user to manually rotate the motor 34, shown in FIG. 2. The manual input 48 may be, for example, a knob or the like coupled to a shaft of the motor 34 that, when rotated, causes a corresponding rotation of the shaft. This rotation results in a manual actuation of the motorized drive assembly 32, shown in FIG. 2, and upper member 26 of test station 16, which facilitates alignment of upper member 26 relative to base member 24 so that test piece 14, shown in FIG. 1, may be inserted into test station 16.

Although the motor control input 42 is shown in FIGS. 3 and 4 as a button for simplicity, the motor control input 42 may be any other type of known input device such as a switch, dial, lever, touch screen, or the like and/or any combination thereof.

Figure 5:
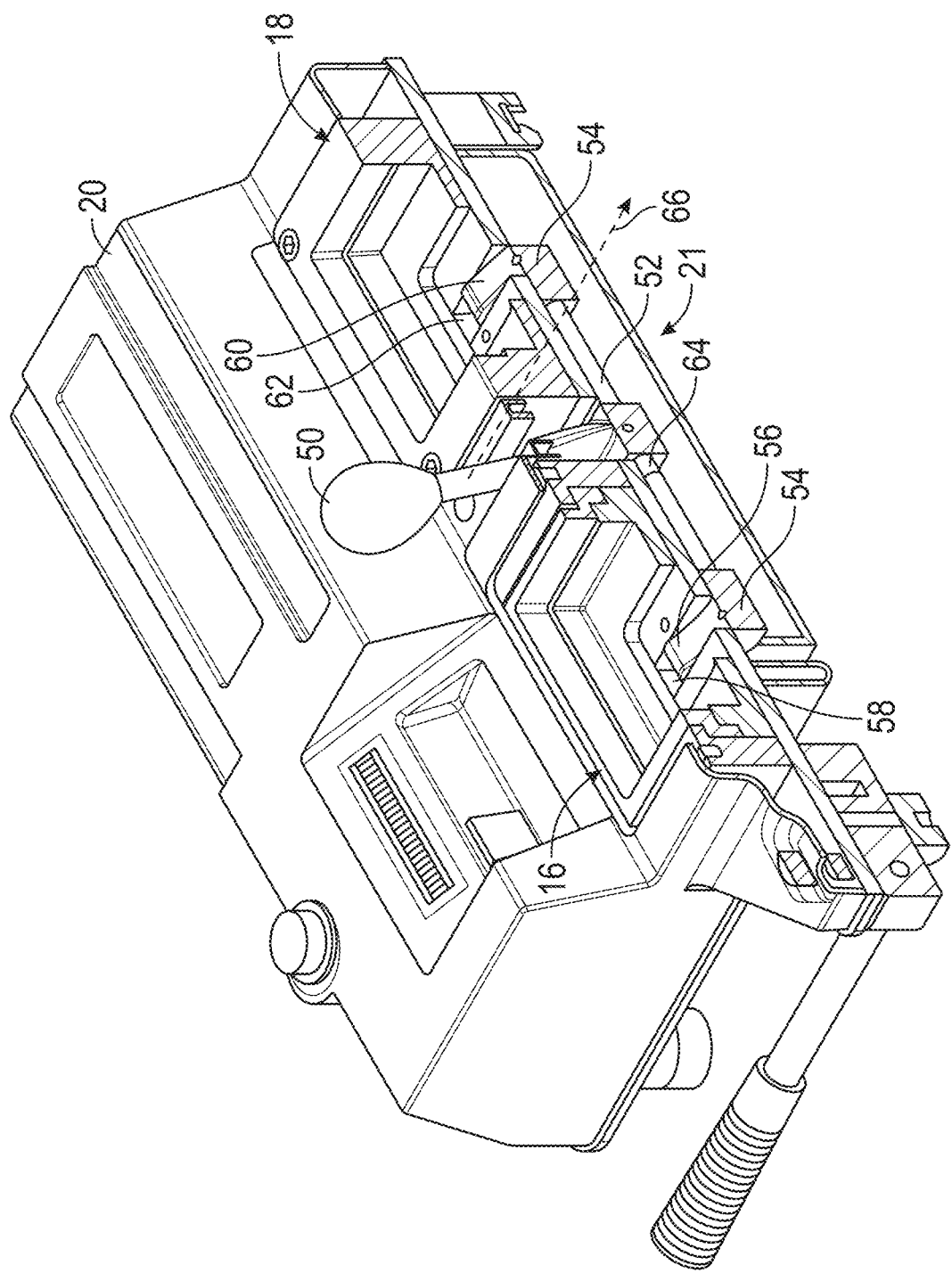
FIG. 5 is a front cross-sectional perspective view of the vibration testing apparatus shown in FIG. 2.

Referring to FIG. 5, the ejection system 21 for assisting with removal of test pieces 14, shown in FIG. 1, from the test station 16 and/or the preparation station 18 is shown. The ejection system 21 includes a handle 50 fixed to an axle 52 that is rotationally coupled to an underside of the body 20 by bearings 54. The axle 52 includes a first cam member 56 secured thereto proximate the test station 16 and cooperating with an opening 58 formed through a bottom surface of the test station 16. The axle 52 also includes a second cam member 60 secured thereto proximate the preparation station 18 and cooperating with an opening 62 formed through a bottom surface of the preparation station 18. The ejection system 21 may also include a biasing member 64, such as a spring or the like, biasing the ejection system 21 toward a non-actuated position shown in FIG. 5. The handle 50 is movable in direction 66 from the non-actuated position shown in FIG. 5 to an ejection position. As the handle 50 moves, the axle 52 rotates, the first cam member 56 moves upward through the opening 58 into the test station 16, and the second cam member 60 moves upward through the opening 62 into the preparation station 18.

Figure 6:
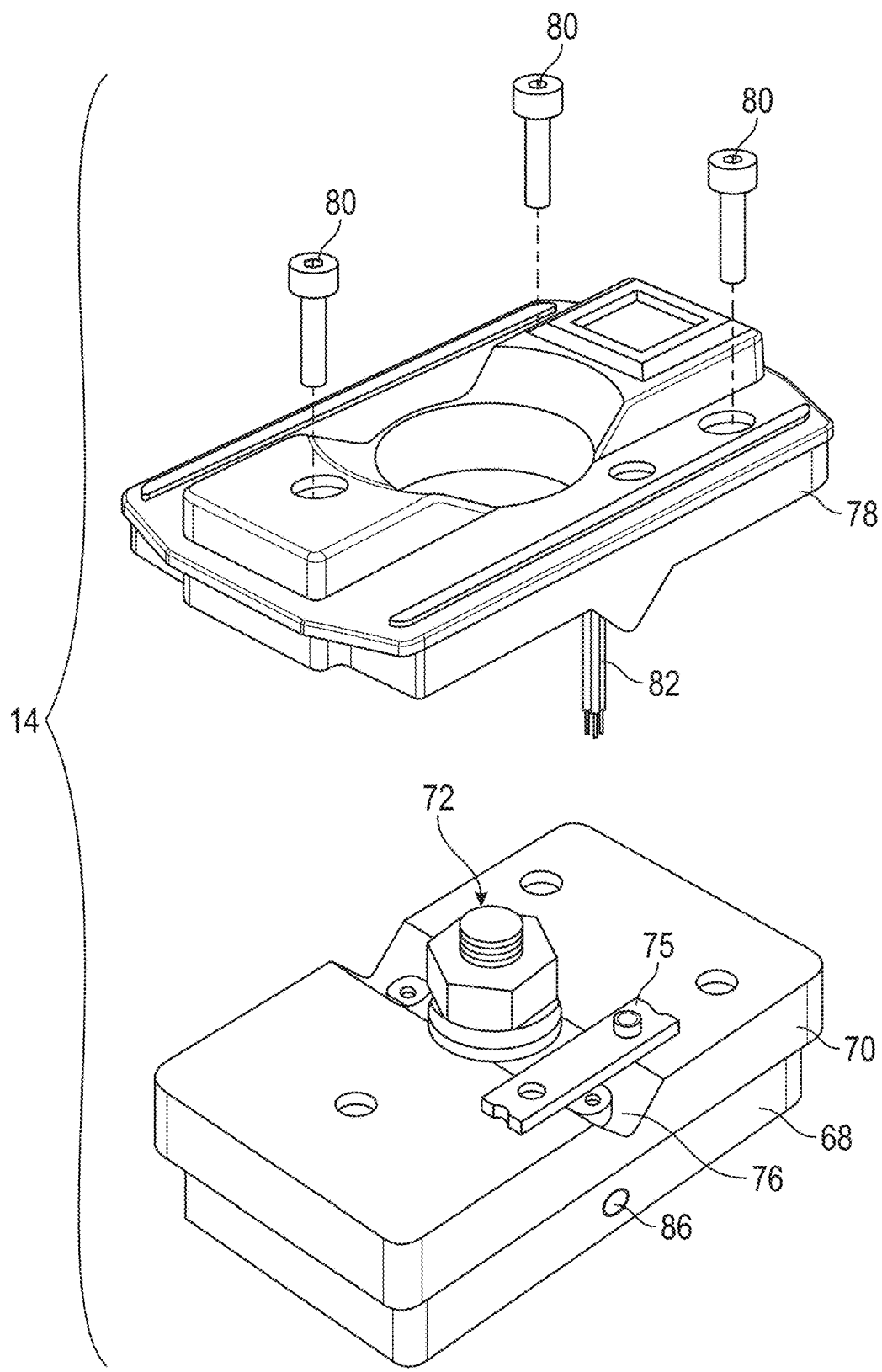
FIG. 6 is a partially exploded perspective view of a test piece of the fastener testing system shown in FIG. 1.
Figure 7:
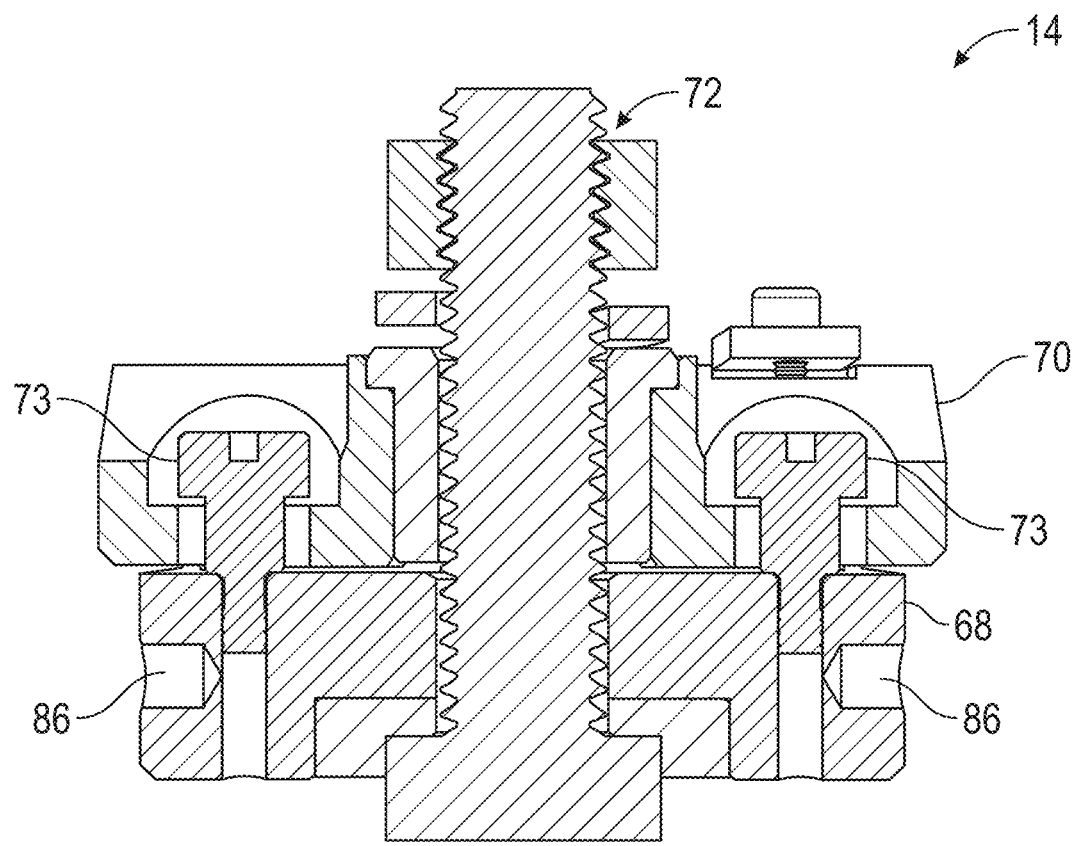
FIG. 7 is a side cross-sectional view of the test piece shown in FIG. 6.
Figure 8:
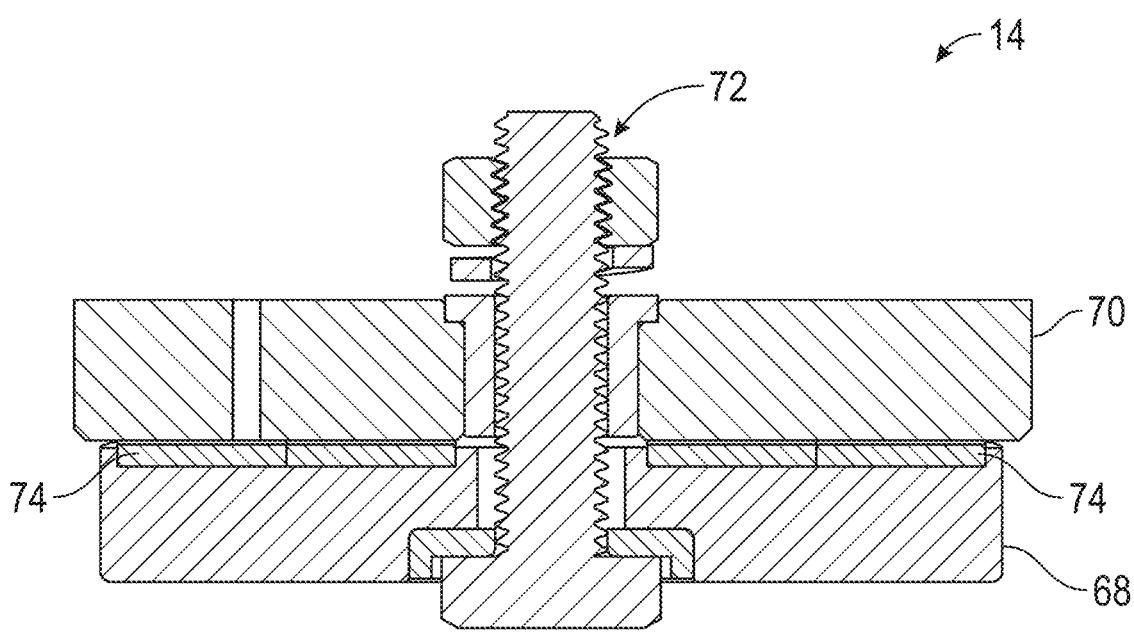
FIG. 8 is a front cross-sectional view of the test piece shown in FIG. 6.

Referring to FIGS. 6-8, each test piece 14 of the fastener testing system 10 includes a lower joint member 68, an upper joint member 70, and a fastener 72 securing the lower joint member 68 and upper joint member 70 together. The test piece 14 may have a stepped design with the lower joint member 68 being smaller than the upper joint member 70.

As seen in FIG. 7, in addition to the fastener 72, alignment bolts 73 may also secure the upper joint member 70 to the lower joint member 68. The alignment bolts 73 threadedly engage one of the upper joint member 70 or lower joint member 68 and have a clearance fit with the other of the upper joint member 70 or lower joint member 68 to allow transverse movement of the upper joint member 70 relative to the lower joint member 68. For example, as shown in FIG. 7, the upper joint member 70 has a clearance fit with alignment bolts 73, while lower joint member 68 threadedly engages the alignment bolts 73. As seen in FIG. 8, the test piece 14 may also include bearings 74, such as needle bearings or the like, positioned between the lower joint member 68 and upper joint member 70. The bearings 74 reduce friction between the lower joint member 68 and upper joint member 70, thereby making it easier for the upper joint member 70 to move in transverse motion relative to the lower joint member 68 during testing so that less power is needed.

Referring back to FIG. 6, the upper joint member 70 has a sensor 75, such as a strain gauge or the like, secured thereto. The upper joint member 70 may also include a transverse groove 76 proximate the fastener 72, with the sensor 75 being positioned to span across the transverse groove 76 in order to amplify the readings taken by the sensor 75 because the transverse groove 76 provides strain concentration. Prior to testing of the test piece 14, a sensor transmitter 78 may be attached to the test piece 14 by one or more screws 80. The sensor transmitter 78 is connected to the sensor 75 by wires 82, or the like, and may be connected to sensor port 46 of the vibration testing apparatus 12, shown in FIG. 4, by cable 84, shown in FIG. 4, to facilitate communication between the sensor 75 and the controller 40 of the vibration testing apparatus 12, shown in FIG. 3.

The lower joint member 68 may include a locator hole 86 configured to be engaged by a set screw member 88 of the vibration testing apparatus 12, shown in FIG. 1, to align and/or secure the test piece 14 in the test station 16, shown in FIG. 1, during testing. Additionally, to ensure that the test piece 14 is aligned and/or secured in test station 16 regardless of orientation, the lower joint member 68 may include locator holes 86 on opposite sides thereof, as seen in FIG. 7.

Figure 9:
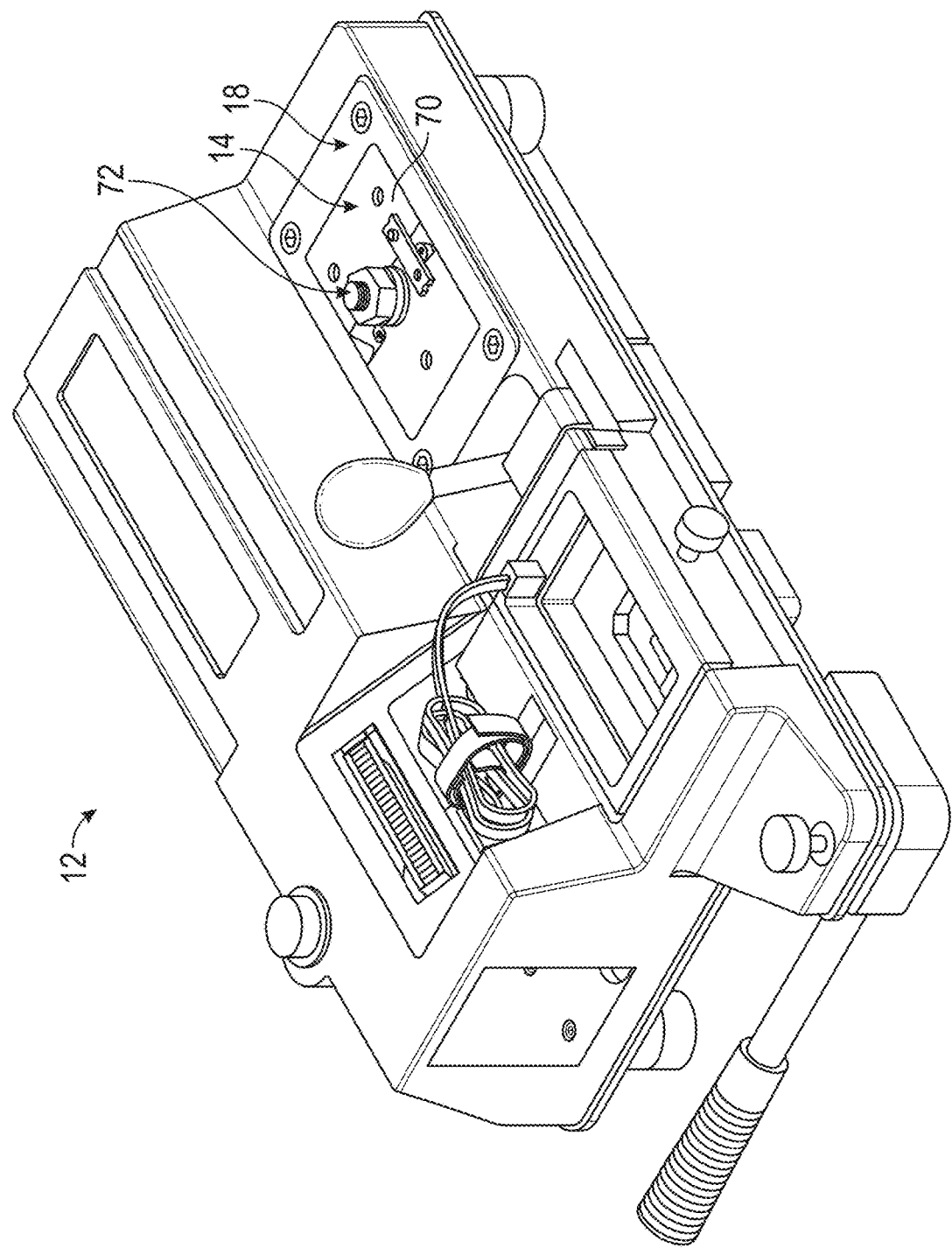
FIG. 9 is a perspective view of the fastener testing system shown in FIG. 1 during operation.

Referring to FIG. 9, in operation, each test piece 14 is prepared for testing in the preparation station 18. For example, each test piece 14 may be assembled in the preparation station 18 or, alternatively, prior to insertion in the preparation station 18, each test piece 14 may be pre-assembled with the fastener 72 holding the lower joint member 68, shown in FIG. 8, and upper joint member 70 together, but not yet torqued to its final desired torque specification, thereby allowing for some relative movement between the lower joint member 68 and upper joint member 70. If the capabilities and/or characteristics of a threadlocker are to be tested in the vibration testing apparatus 12, the threadlocker may be applied to the fastener 72 during assembly or pre-assembly.

Figure 10:
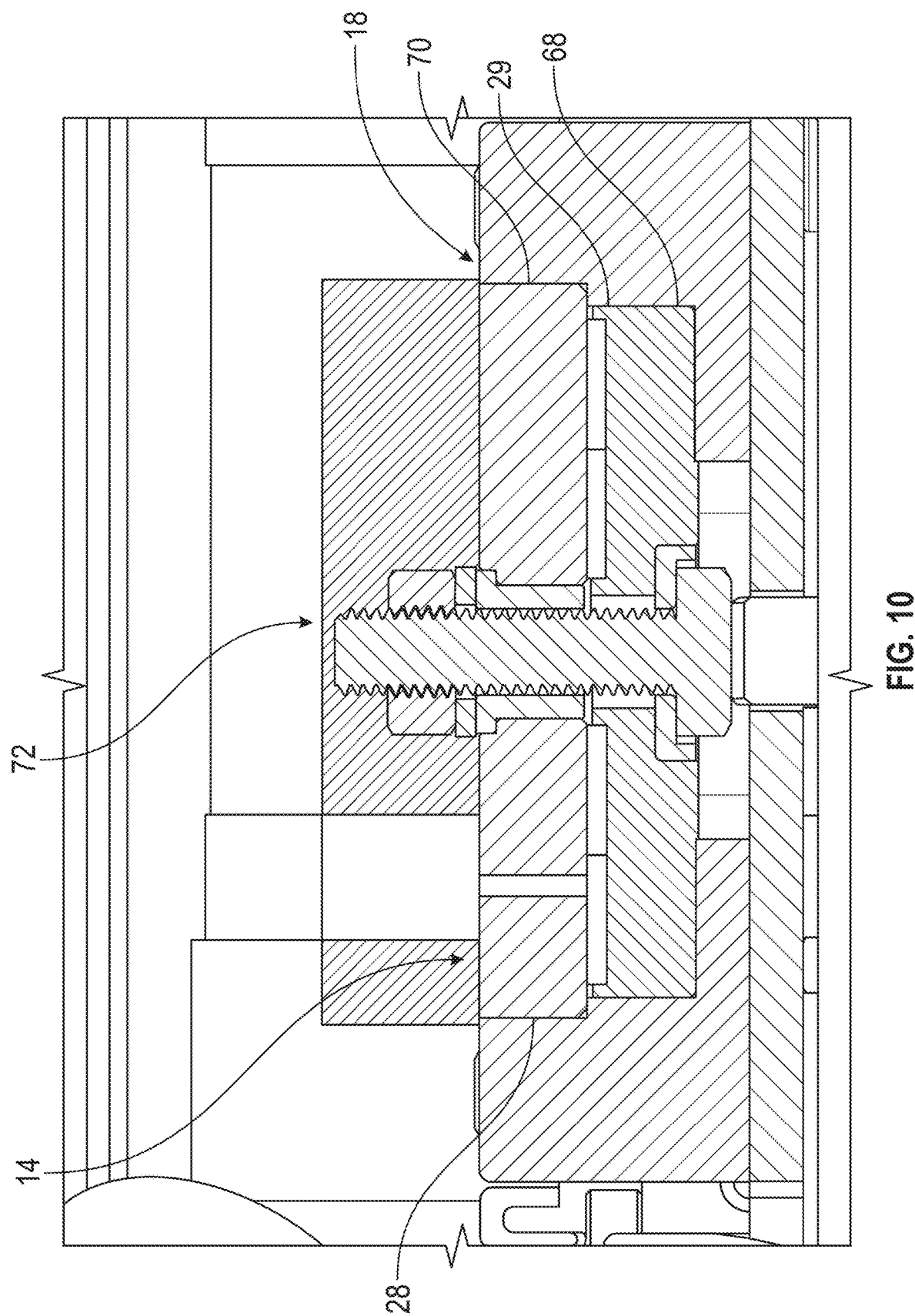
FIG. 10 is an enlarged front cross-sectional view of the fastener testing system shown in FIG. 9 during preparation of a test piece.

Referring to FIG. 10, when the lower joint member 68 and upper joint member 70 are inserted into the cavity 28 of the preparation station 18, during assembly or as the pre-assembled test piece 14, the stepped configuration of the inner wall 29 ensures that the upper joint member 70 is properly positioned relative to the lower joint member 68. The fastener 72 may then be torqued to its final desired torque specification to couple the lower joint member 68 and upper joint member 70 together.

Figure 11:
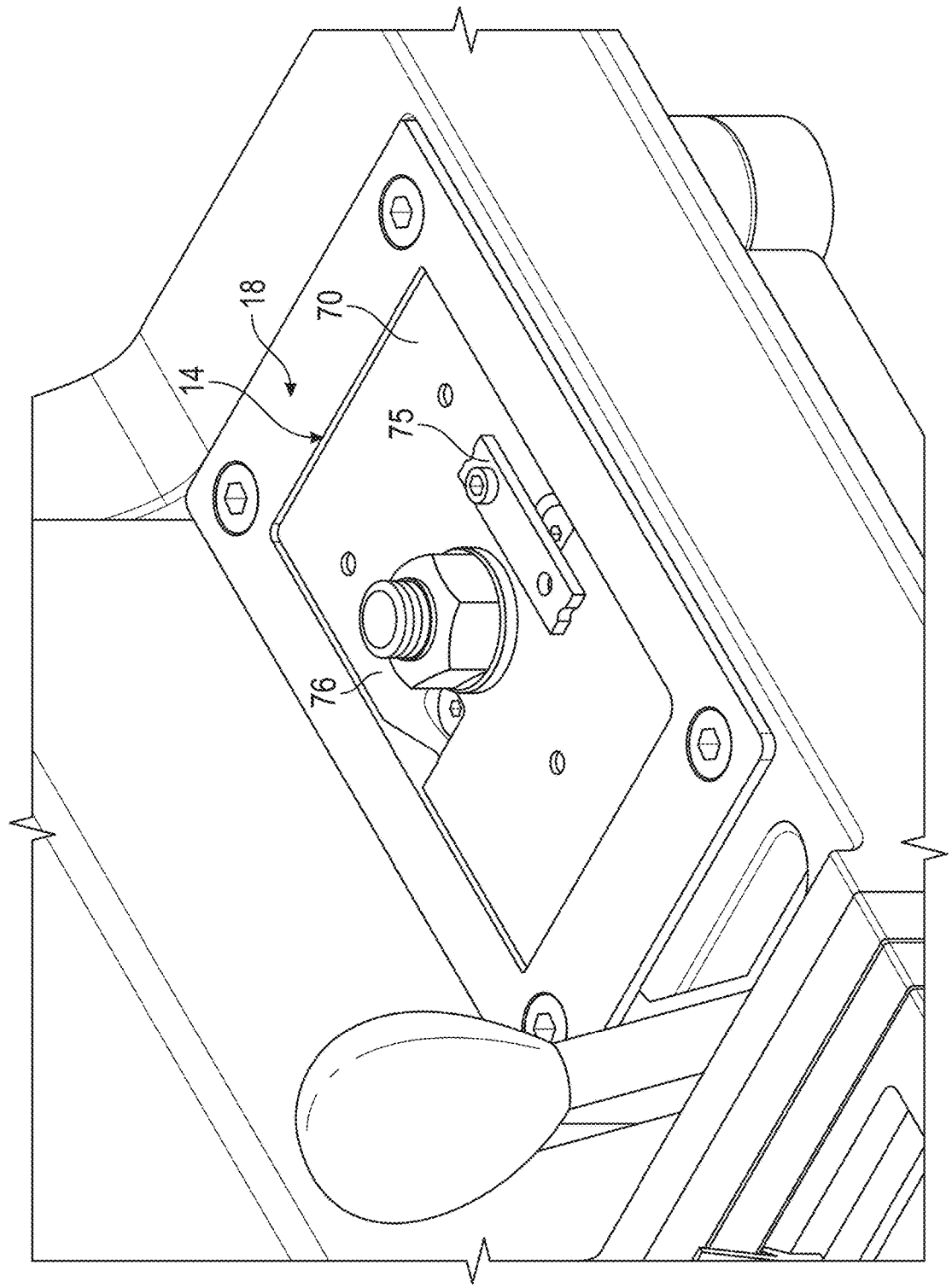
FIG. 11 is an enlarged perspective view of the fastener testing system shown in FIG. 9 during preparation of a test piece.

Referring to FIG. 11, while the test piece 14 is in the preparation station 18, sensor 75 may be secured to the test piece 14, for example, by screws or the like. As discussed above, the sensor 75 may be positioned to span across the transverse groove 76 formed in the upper joint member 70 to amplify the readings taken by the sensor 75 during testing of the test piece 14.

Figure 12:
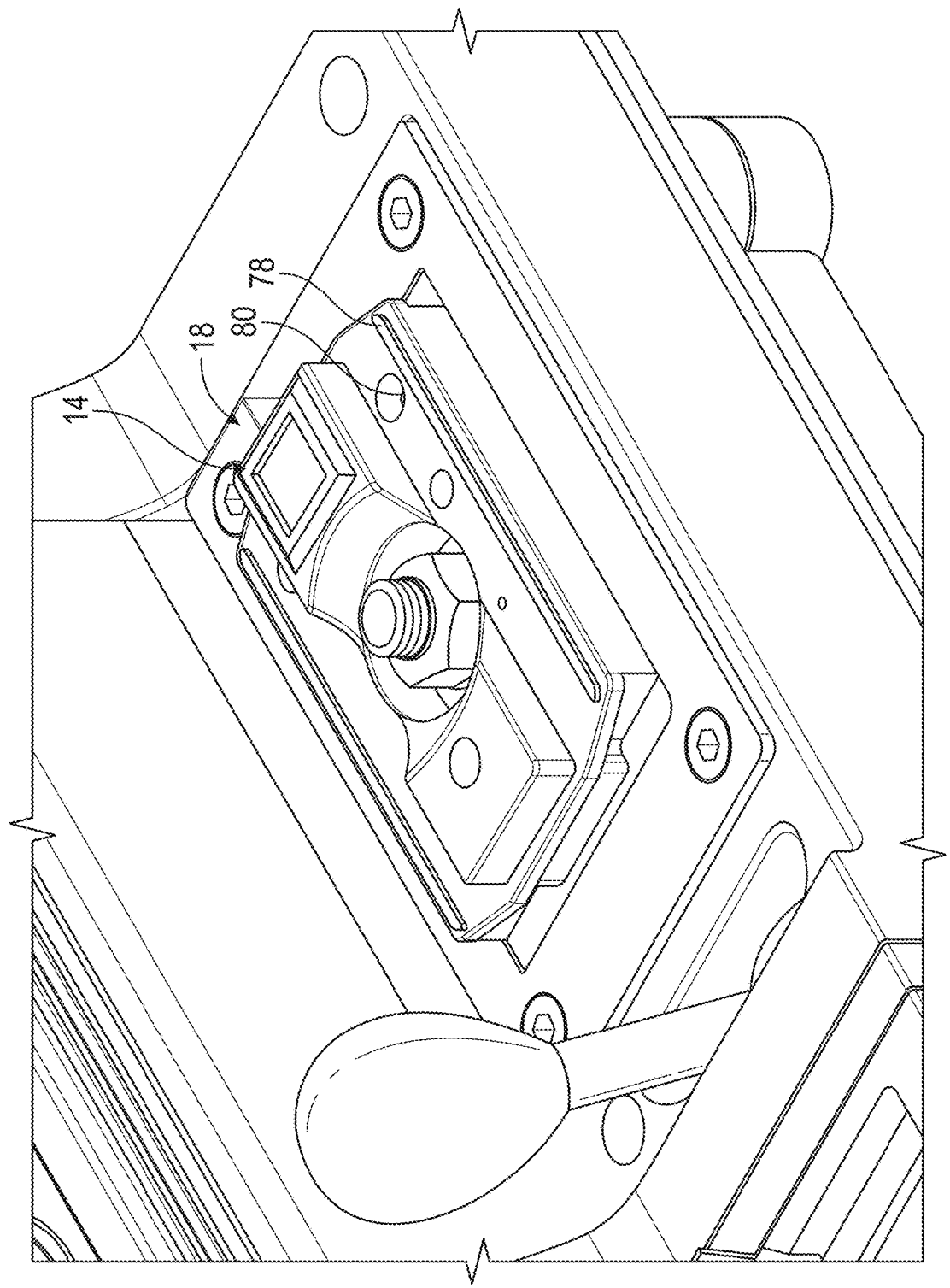
FIG. 12 is an enlarged perspective view of the fastener testing system shown in FIG. 9 during preparation of a test piece.

Referring to FIG. 12, while the test piece 14 is in the preparation station 18, the sensor transmitter 78 may be connected to the sensor 75 by wires 82, or the like, shown in FIG. 6, and may also be attached to the test piece 14 by screws 80. Once installed on the test piece 14, the sensor transmitter 78 advantageously forms a protective cover for the sensor 75.

Figure 13:
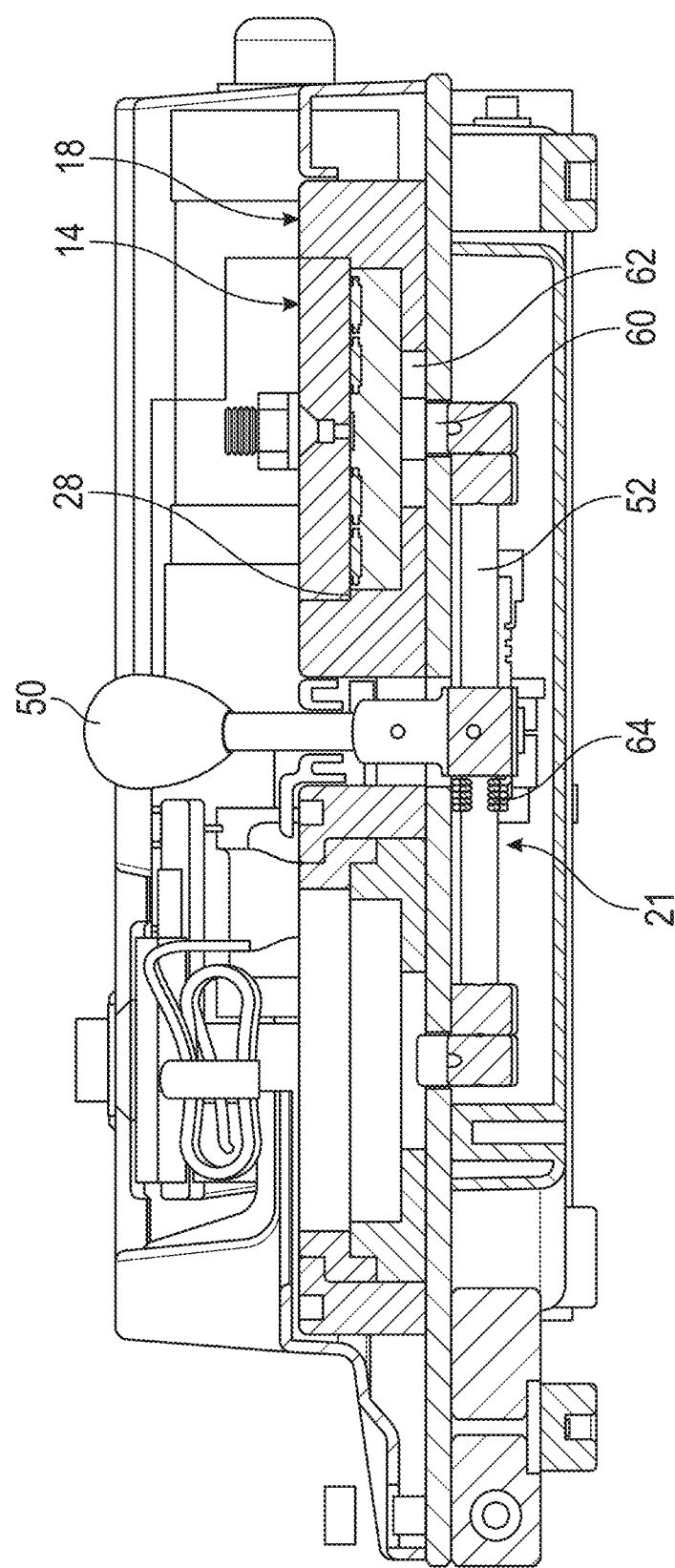
FIG. 13 is a front cross-sectional view of the fastener testing system shown in FIG. 9.

Referring to FIG. 13, once the test piece 14 has been prepared in the preparation station 18, the test piece 14 may be removed therefrom using the ejection system 21. Specifically, the handle 50 may be pulled in direction 66, shown in FIG. 5, from the non-actuated position shown in FIG. 11 to the ejection position. As the handle 50 moves, the axle 52 rotates, and the second cam member 60 moves upward through the opening 62 into the preparation station 18, pushing upward on the test piece 14. This causes the test piece 14 to move upward and out of the cavity 28. The handle 50 may then be returned to the non-actuated position. For example, where the ejection system 21 includes biasing member 64, the handle 50 may simply be released to allow the biasing member 64 to return the ejection system 21 to the non-actuated position.

Additional test pieces 14 may be prepared in the same manner described above. For example, if different threadlockers are to be tested and compared, multiple test pieces 14 may be prepared in the manner discussed above, with each test piece 14 having one of the different threadlockers applied to the fastener 72 of the test piece 14.

Although the sensor 75 and sensor transmitter 78, shown in FIG. 6, are described above as being installed on the test piece 14 while the test piece 14 is positioned in the preparation station 18, the sensor 75 and sensor transmitter 78 may instead be installed on the test piece 14 after the test piece 14 has been removed from the preparation station 18 in the manner described above.

Figure 14:
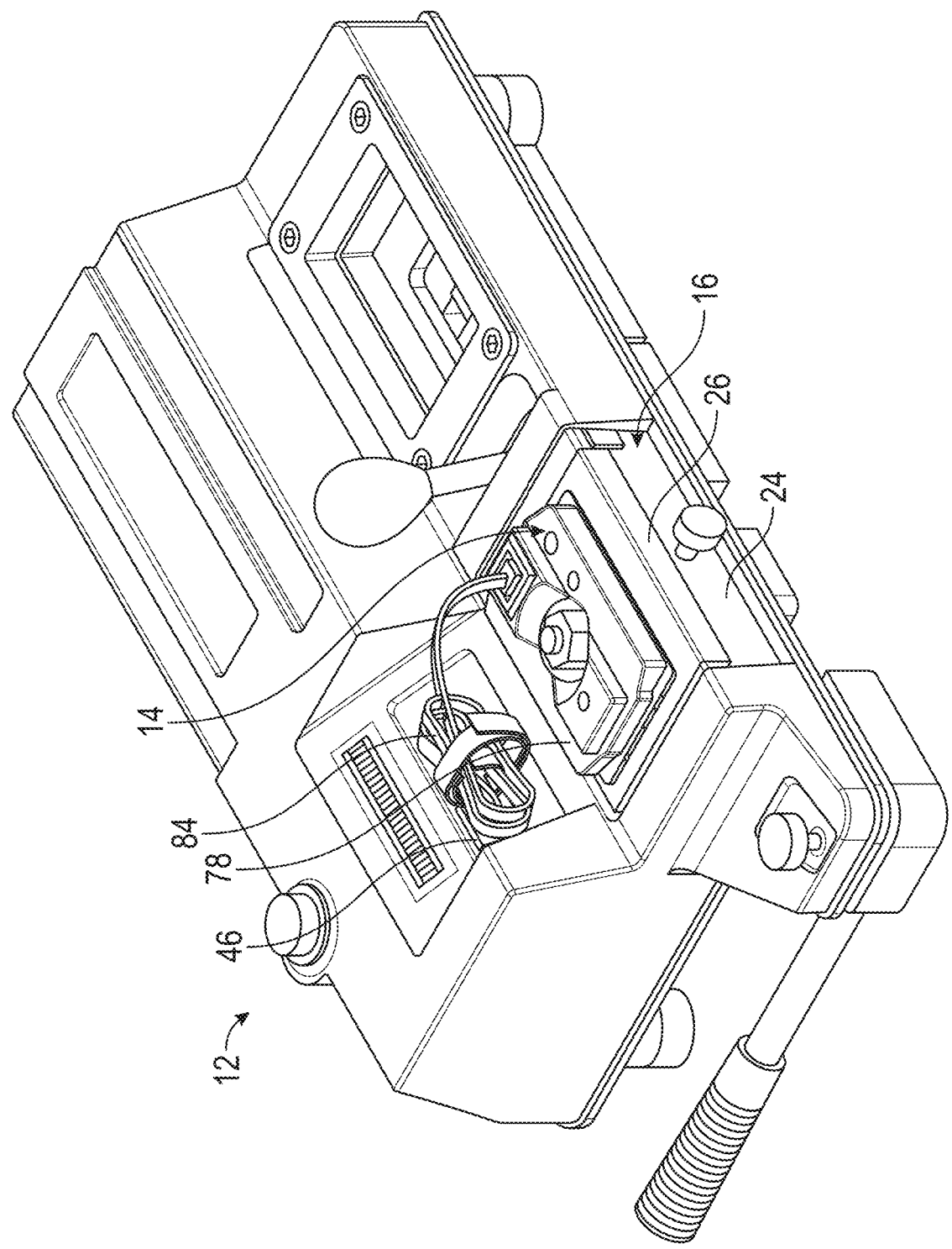
FIG. 14 is a perspective view of the fastener testing system shown in FIG. 1 during operation.

Referring to FIG. 14, once the test pieces 14 have been prepared, each test piece 14 is then inserted into the test station 16 of the vibration testing apparatus 12 for testing as shown. During insertion of the test piece 14 into the test station 16, the manual input 48, shown in FIG. 4, may be used to slidingly move the upper member 26 of the test station 16 relative to the base member 24 in order to properly align the upper member 26 relative to the base member 24 to accommodate the stepped shape of the test piece 14 so that test piece 14 may be inserted into test station 16. Once the test piece 14 has been inserted into the test station 16, the sensor transmitter 78 may be connected to the sensor port 46 by cable 84 to enable communication therebetween. Additionally, with reference to FIG. 15, the set screw 88 of the vibration testing apparatus 12 may be tightened so that it engages the locator hole 86 formed in the lower joint member 68 of the test piece 14 to secure the lower joint member 68 in the test station 16.

Figure 15:
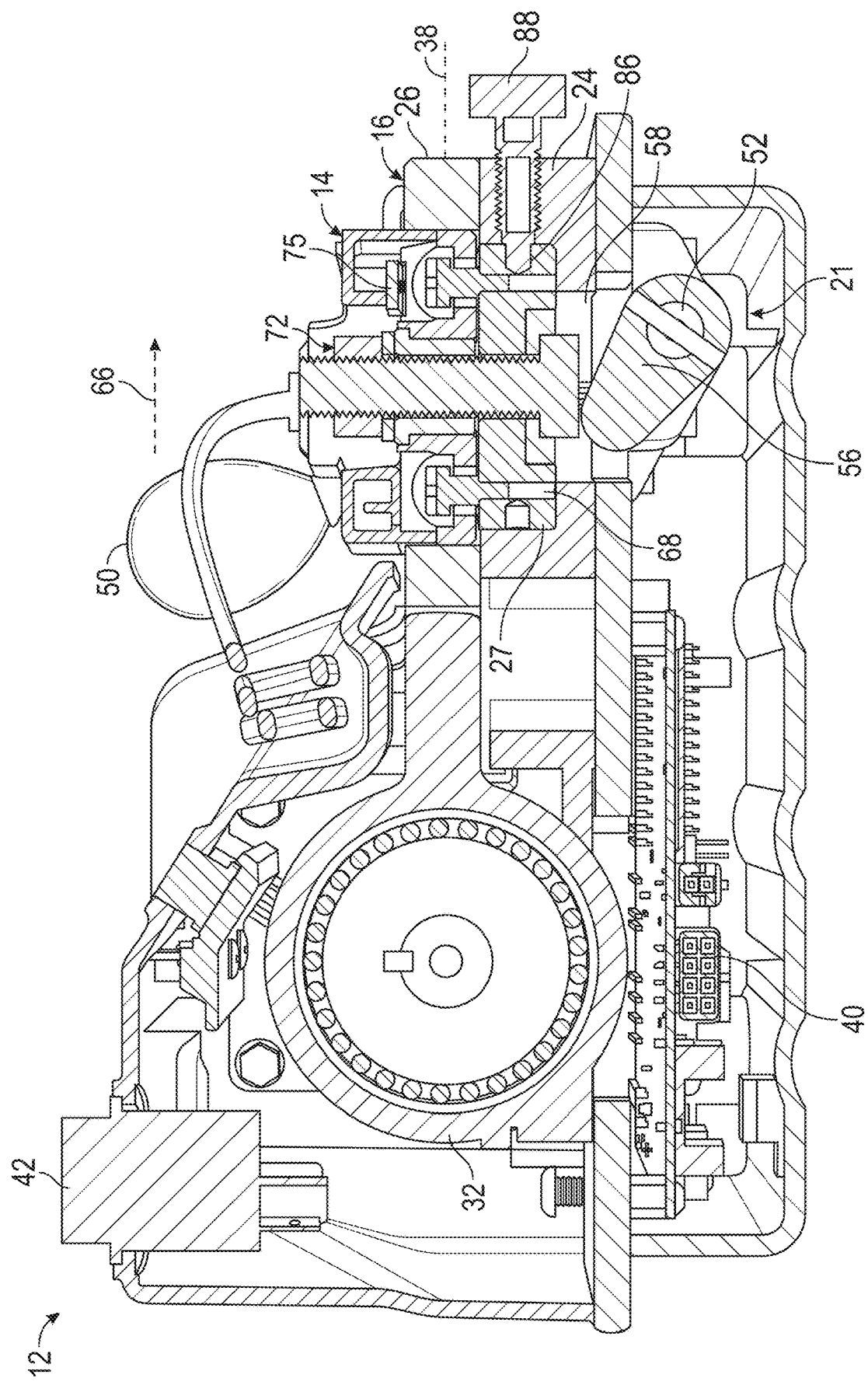
FIG. 15 is a side cross-sectional view of the fastener testing system shown in FIG. 14 during testing of a test piece.

Referring to FIG. 15, once the test piece 14 is installed in the test station 16, testing may be initiated by actuating the motor control input 42, which signals the controller 40 to power the motorized drive assembly 32 to drive the upper member 26 in reciprocating transverse motion relative to the base member 24 along axis 38. The motorized drive assembly 32 may be controlled by controller 40 in a variety of ways in response to actuation of the motor control input 42. For instance, when the motor control input 42 is actuated, the controller 40 may run the motorized drive assembly 32 for a preset time period, such as thirty seconds, one minute, five minutes, or any other desired duration. Alternatively, the controller 40 may run the motorized drive assembly 32 until a signal from sensor 75 indicates failure of the fastener 72 and/or threadlocker applied to fastener 72 of the test piece 14. The vibration testing apparatus 12 could also be configured such that the controller 40 only runs the motorized drive assembly 32 while the motor control input 42 is depressed, or such that a first push of the motor control input 42 activates the motorized drive assembly 32 and a second push of the motor control input 42 deactivates the motorized drive assembly 32.

Figure 16:
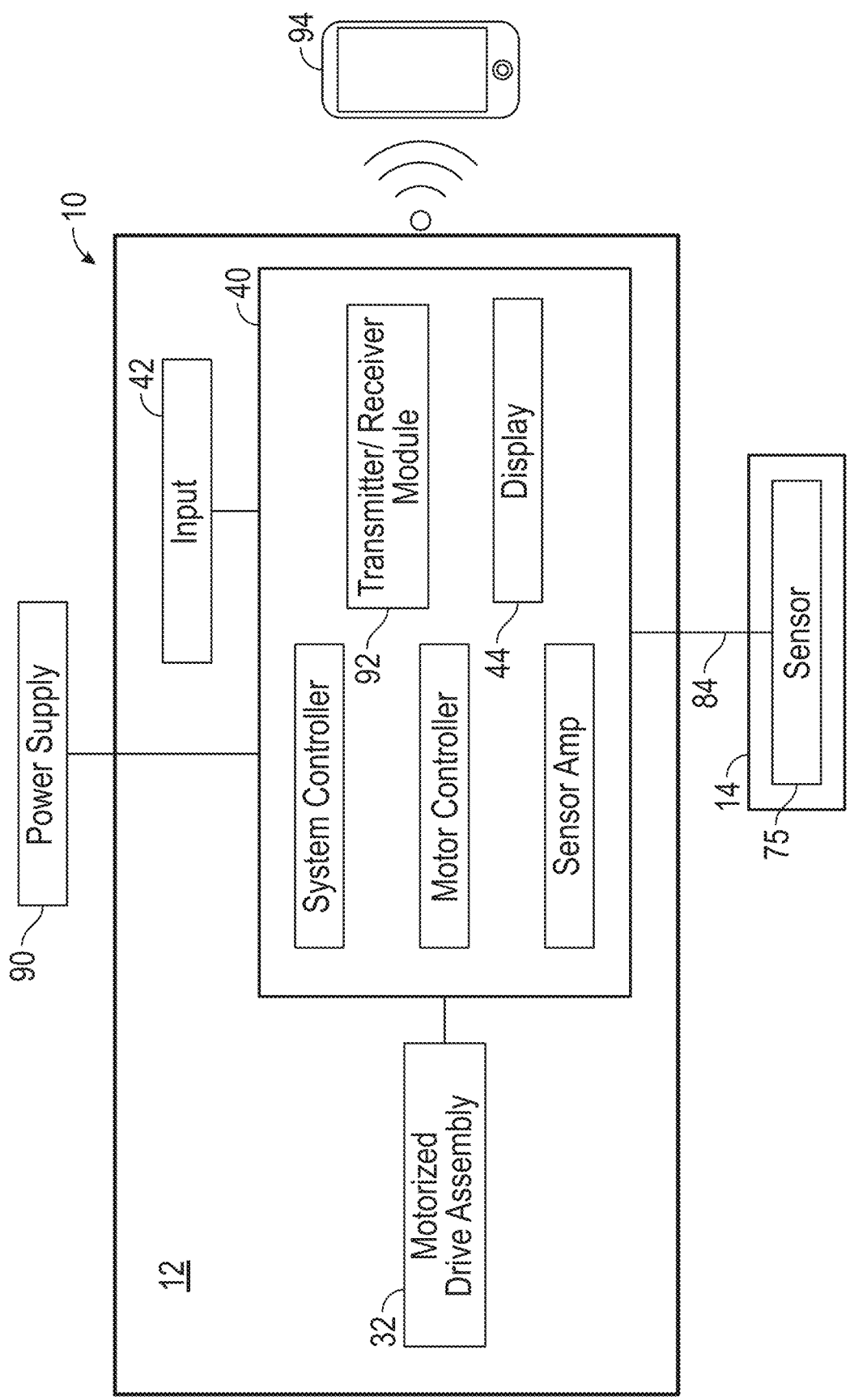
FIG. 16 is a schematic view of the fastener testing system of FIG. 1.

FIG. 16 shows a schematic diagram of the fastener testing system 10. As shown, the sensor 75 on the test piece 14 is operatively connected to the controller 40 of the vibration testing apparatus 12 by cable 84. The controller 40 is operatively connected to the motor control input 42 and the motorized drive assembly 32, as discussed above, and to a power supply 90 supplying power to the vibration testing apparatus 12. The controller 40 may also include a transmitter/receiver 92 such as a Bluetooth module, wireless router, cellular module, or the like. Additionally, although described as a wireless transmitter, the transmitter/receiver 92 may provide a wired connection port such as a USB port or the like.

As the test piece 14 is tested, the motorized drive assembly 32 drives the upper member 26, shown in FIG. 15, in reciprocating transverse motion relative to the base member 24, shown in FIG. 15, and data from the sensor 75 is provided to the controller 40. A user may hold the stabilization handle 22, shown in FIG. 1, during testing to provide counter-leverage counteracting the reciprocating transverse motion of upper member 26, shown in FIG. 15. The data may be visually displayed by the controller 40 on display 44 and/or may be used by the controller 40 to determine failure of the fastener 72, shown in FIG. 15, and/or threadlocker applied to fastener 72 for deactivating the motorized drive assembly 32 as discussed above. For example, the sensor 75 may measure force indicative of the clamp load provided by the fastener 72 so that a loss of the clamp load may be detected from the sensor force data. The display 44 may display numerical data, or the display 44 may simply provide a visual indication of the loss of clamp load. For example, the display 44 may include light emitting diodes ("LEDs") that change color from a first color to a second color as clamp load is lost. The controller 40 may also use the transmitter/receiver 92 to transmit the data to a remote device 94, such as a computer, tablet, mobile phone, or the like, for further processing and/or display. Once the testing of test piece 14 is completed, such as when the data from sensor 75 indicates a loss of clamp load indicating a loosening of the fastener 72 and/or threadlocker applied to fastener 72, the motorized drive assembly 32 may be deactivated either automatically by controller 40 or manually by the user.

Referring back to FIG. 15, once the test piece 14 has been tested in the test station 16, the test piece 14 may be removed therefrom using the ejection system 21. Specifically, the handle 50 may be pulled in direction 66 from the non-actuated position shown in FIG. 15 to the ejection position. As the handle 50 moves, the axle 52 rotates, and the first cam member 56 moves upward through the opening 58 into the test station 16, pushing upward on the test piece 14. This causes the test piece 14 to move upward and out of the test cavity 27. The handle 50 may then be returned to the non-actuated position. For example, where the ejection system 21 includes biasing member 64, shown in FIG. 13, the handle 50 may simply be released to allow the biasing member 64 to return the ejection system 21 to the non-actuated position.

Additional test pieces 14 may be tested in the same manner described above. For example, where multiple test pieces 14 were prepared in the manner described above to test different threadlockers, the multiple test pieces 14 may be tested consecutively in the test station 16 in the manner discussed above. As discussed above, during each test, the data from sensor 75, shown in FIG. 16, may be provided to remote device 94, shown in FIG. 16. The remote device 94 may advantageously display and/or plot the data from multiple tests together for comparison purposes.

Figure 17:
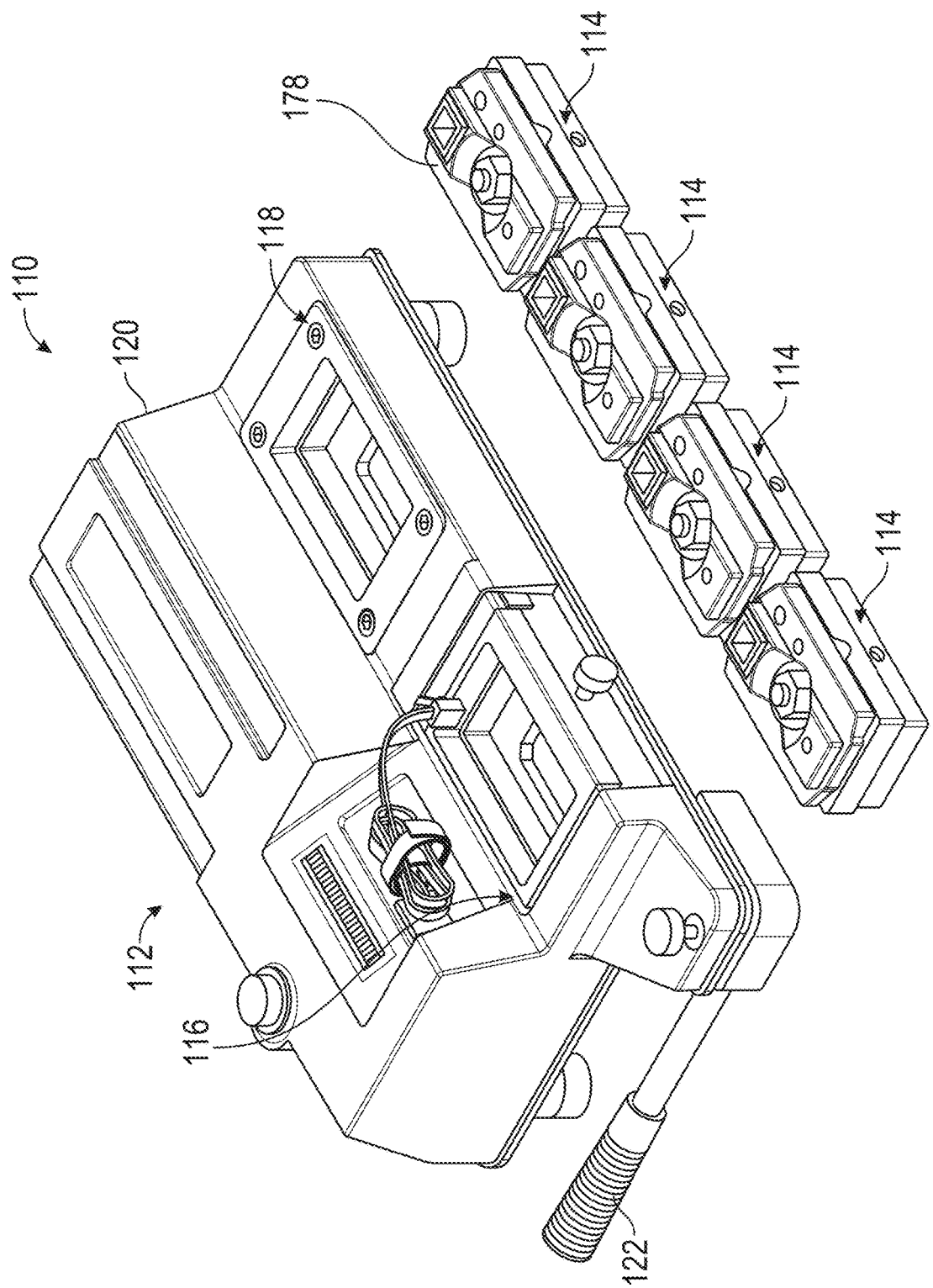
FIG. 17 is a perspective view of a fastener testing system in accordance with the present disclosure.

Referring to FIG. 17, wherein like numerals represent like elements, another embodiment of a fastener testing system 110 is shown. The fastener testing system 110 is identical to the fastener testing system 10, shown in FIG. 1, except that it does not include the ejection system 21, shown in FIG. 1. Thus, the fastener testing system 110 includes a vibration testing apparatus 112 and one or more test pieces 114. The vibration testing apparatus 112 includes a test station 116 and a preparation station 118 arranged in a body 120. The vibration testing apparatus 112 may also include a stabilization handle 122 at an end of the body 120.

Test pieces 114 are prepared in preparation station 118 and tested in testing station 116 in the same manner discussed above in connection with fastener testing system 10, shown in FIG. 1. However, in order to remove the test pieces 114 from the preparation station 118 and the testing station 116, the user or operator simply grabs the test piece 114 that is to be removed, for example by sensor transmitter 178, and then pulls upward on the test piece 114 to extract the test piece 114 from the preparation station 118 or the testing station 116 in which it is positioned. Other than the absence of the ejection system 21, shown in FIG. 1, the fastener testing system 110 is identical to the fastener testing system 10, shown in FIG. 1, and operates in the same manner as the fastener testing system 10, shown in FIG. 1, and, therefore, the structure and operation of fastener testing system 110 will not be described in detail.

The fastener testing systems 10, 110 of the present disclosure advantageously provide portable, self-contained testing devices for testing and comparing fasteners and adhesive threadlockers applied to such fasteners. The stabilization handle 22, 122 may advantageously be used to carry and transport the vibration testing apparatus 12, 112. Both the preparation station 18, 118 and the testing station 16, 116 are advantageously included in a single unit that allows for interchangeable test pieces 14, 114 to be prepared and tested without having to wait for adhesive threadlockers to cure between tests and without requiring disassembly and/or assembly between tests to position new fasteners in the testing apparatus. For example, multiple test pieces 14, 114 may be prepared hours or even days ahead of a test procedure or demonstration. The test pieces 14, 114 advantageously have a stepped design that prevents jamming of the vibration testing apparatus 12, 112. The fastener testing system 10, 110 may advantageously interface with remote devices 94 to provide improved data capture and/or processing, for example to provide for a comparison of strength of different adhesive threadlockers being tested.

While the principles of the system and apparatus have been described herein, it is to be understood by those skilled in the art that this description is made only by way of example and not as a limitation as to the scope of the invention. As will be recognized by those of ordinary skill in the pertinent art, numerous changes and modifications may be made to the above-described system and apparatus of the present disclosure without departing from the spirit of the invention and those changes and modifications are considered to be within the scope of the present disclosure. Accordingly, the exemplary embodiments described in this specification are to be taken as merely illustrative and not limiting.

What is claimed is:

1. A vibration testing apparatus comprising:
a test station including a first member and a second member defining an opening configured to receive a test piece therein, the second member configured to slide in reciprocating transverse motion relative to the first member; and
a motorized drive assembly, the motorized drive assembly configured to drive the second member in the reciprocating transverse motion relative to the first member;
wherein the test piece includes a fastener, a first joint member and a second joint member, the fastener coupling the first joint member together with the second joint member; and
wherein the first member and the second member are configured such that the second member vibrates the second joint member of the test piece relative to the first joint member of the test piece when the second member slides in reciprocating motion relative to the first member.

2. The vibration testing apparatus according to claim 1, further comprising a preparation station, the preparation station being separate from the test station and including an opening configured to receive the test piece therein and to position a first joint member of the test piece relative to a second joint member of the test piece with proper alignment.

3. The vibration testing apparatus according to claim 2, wherein the reciprocating transverse motion of the second member of the test station relative to the first member vibrates the second joint member of the test piece relative to the first joint member of the test piece while the test piece is disposed in the test station.

4. The vibration testing apparatus according to claim 1, further comprising:
a motor control input; and
a controller, the controller being operatively connected to the motor control input and the motorized drive assembly and configured to activate the motorized drive assembly in response to a signal from the motor control input.

5. The vibration testing apparatus according to claim 4, wherein the controller is operatively connectable to a sensor of the test piece.

6. The vibration testing apparatus according to claim 5, further comprising a display, wherein the controller is configured to provide an indication on the display when the fastener of the test piece fails.

7. The vibration testing apparatus according to claim 6, wherein the indication is based on a clamp load detected by the sensor.

8. The vibration testing apparatus according to claim 6, wherein the controller further comprises a transmitter module configured to communicate with a remote device, the controller being configured to provide a signal indicative of a clamp load detected by the sensor to the remote device.

9. A vibration testing apparatus comprising:
a preparation station configured to have a plurality of test pieces sequentially assembled therein with proper alignment, each of the test pieces having a fastener, a first joint member and a second joint member, and each fastener coupling together each respective first joint member with the respective second joint member;
a test station configured to sequentially receive and vibrate the second joint member of each test piece of the plurality of test pieces relative to the respective first joint member of each assembled test piece of the plurality of test pieces; and
a motorized drive assembly configured to vibrate at least a portion of the test station.

10. The vibration testing apparatus according to claim 9, further comprising a controller operatively connected to the motorized drive assembly, the controller powering the motorized drive assembly to vibrate the at least a portion of the test station by driving a first member of the test station in reciprocating transverse motion relative to a second member of the test station.

11. The vibration testing apparatus according to claim 10, further comprising a securing system configured to secure a portion of each assembled test piece to the second member of the test station while the test piece is vibrated therein.

12. The vibration testing apparatus according to claim 10, further comprising a manual input for manually driving the motorized drive assembly to align the first member and second member of the test station for receipt of an assembled test piece of the plurality of test pieces in the test station.

13. The vibration testing apparatus according to claim 9, wherein the preparation station is separate from and adjacent to the test station.

14. The vibration testing apparatus according to claim 9, further comprising an ejection system configured to eject test pieces pieces of the plurality of test pieces from at least one of the preparation station or test station.

15. A fastener testing system comprising:
a plurality of test pieces each having a fastener a first joint member and a second joint member; and
a vibration testing apparatus including a test station configured to receive and vibrate the second joint member relative to the first joint member of a test piece of the plurality of test pieces and a preparation station for assembling each test piece of the plurality of test pieces, the preparation station being adjacent to the test station.

16. The fastener testing system according to claim 15, wherein the test station includes a first member and a second member defining an opening configured to receive a test piece therein, the second member configured to slide in reciprocating transverse motion relative to the first member.

17. The fastener testing system according to claim 16, wherein the vibration testing apparatus further comprises a motorized drive assembly configured to drive the second member in the reciprocating transverse motion relative to the first member.

18. The fastener testing system according to claim 15, wherein each fastener of each test piece of the plurality of test pieces couples the respective first joint member to the respective second joint member.

19. The fastener testing system according to claim 18, wherein the preparation station includes an opening configured to receive one test piece of the plurality of test pieces therein and to position the first joint member of the test piece relative to the second joint member of the test piece.

\* \* \* \* \*